(12) United States Patent
Liu et al.

(10) Patent No.: US 9,402,224 B2
(45) Date of Patent: Jul. 26, 2016

(54) METHOD, APPARATUS AND SYSTEM FOR NEIGHBOR DISCOVERY

(71) Applicant: Huawei Technologies Co., Ltd., Shenzhen, Guangdong (CN)

(72) Inventors: Yanjun Liu, Shenzhen (CN); Biyi Lin, Shenzhen (CN); Yuping Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 324 days.

(21) Appl. No.: 14/029,219

(22) Filed: Sep. 17, 2013

(65) Prior Publication Data
US 2014/0016564 A1 Jan. 16, 2014

Related U.S. Application Data

(63) Continuation of application No. PCT/CN2011/073413, filed on Apr. 28, 2011.

(51) Int. Cl.
*H04W 4/00* (2009.01)
*H04W 40/24* (2009.01)
*H04L 12/46* (2006.01)
*H04L 12/751* (2013.01)

(52) U.S. Cl.
CPC ......... *H04W 40/246* (2013.01); *H04L 12/4641* (2013.01); *H04L 45/02* (2013.01)

(58) Field of Classification Search
CPC .................................................. H04W 40/24
USPC ......................................................... 370/328
See application file for complete search history.

(56) References Cited

U.S. PATENT DOCUMENTS

| 7,593,319 B1 | 9/2009 | Sivasankaran et al. |
| 7,633,883 B2 * | 12/2009 | Cho ..................... H04L 12/4641 370/252 |
| 2002/0046271 A1 | 4/2002 | Huang |
| 2010/0020821 A1 | 1/2010 | Droms et al. |
| 2011/0103344 A1 * | 5/2011 | Gundavelli ........... H04W 8/005 370/331 |

FOREIGN PATENT DOCUMENTS

| CN | 1510862 A | 7/2004 |
| CN | 1866863 A | 11/2006 |
| CN | 101170483 A | 4/2008 |

OTHER PUBLICATIONS

Thaler et al., "IEEE 802.1Q; Media Access Control Bridges and Virtual Bridged Local Area Networks," IETF 86—Tutorial, ieee802.org/1, IETF (Mar. 10, 2013).

* cited by examiner

*Primary Examiner* — Shripal Khajuria
(74) *Attorney, Agent, or Firm* — Leydig, Voit & Mayer, Ltd.

(57) ABSTRACT

A method for neighbor discovery including: transmitting a neighbor detection message according to a neighbor VLAN information table, where the neighbor VLAN information table includes neighbor VLAN information; receiving a neighbor response message with which a terminal responds; acquiring a MAC address of the terminal according to the neighbor response message. With the method, numerous invalid detections, heavy apparatus load and large CPU resource consumption caused by traversing a public network VLAN and a private network VLAN to conduct neighbor detection decease.

6 Claims, 3 Drawing Sheets

METHOD, APPARATUS AND SYSTEM FOR NEIGHBOR DISCOVERY

CROSS-REFERENCE

This application is a continuation of International Patent Application No. PCT/CN2011/073413, filed on Apr. 28, 2011, which is hereby incorporated by reference in its entirety.

TECHNICAL FIELD

The present disclosure relates to network communication field, particularly, to a method, an apparatus and a system for neighbor discovery.

BACKGROUND

The virtual bridged local area networks (VLAN) 802.1Q protocol defines bridge rules for cross-switch communications of a same VLAN and frame formats for proper identifying VLAN, a 12-bit VLAN Tag of a data frame is used to identify the VLAN that a host locates. Due to that the VLAN Tag has only 12 bits, an apparatus can support at most 4094 VLANs. A data frame of a same VLAN, which may be a unicast frame, a multicast frame or a broadcast frame, is limited to be transmitted in the VLAN. In real applications, especially in Metropolitan Area Networks, a lot of VLANs are required to isolate users; and 4094 VLANs are far from meeting the requirements. QinQ (802.1Q in 802.1Q), also named as stacked VLAN or double VLAN technology, is a technology for expanding the VLAN space, and is implemented by encapsulating another layer of virtual bridged local area network protocol tag once again before a layer of virtual bridged local area network protocol tag. A layer of private network VLAN Tag is used to identify a customer network, a layer of public network (backbone network) VLAN Tag is used to identify a carrier network (Provider Network), and the private network VLAN Tag is encapsulated in the public network VLAN Tag, so that a message carries two layers of VLAN Tags to traverse the public network (backbone network). In the public network, an apparatus forwards the message only according to a public network VLAN Tag in an outer layer, and the private network VLAN Tag is transmitted as a data part of the message.

To transmit IP (Internet Protocol) data message on a physical link, it is needed to obtain a destination physical address according to a destination IP address, by neighbor detection. For example, the destination physical address is obtained by using ARP (Address Resolution Protocol) or ND (Neighbor Discovery) protocol. However, when neighbor detection is performed on a QinQ termination interface, as the VLAN will divide a broadcast domain, it is needed to send a detection message to traverse the public network VLAN and the private network VLAN, until a target terminal is found. Since performing neighbor detection by traversing the public network VLAN and the private network VLAN will produce numerous invalid detections, the apparatus load is increased and a lot of processor (such as CPU) resources are consumed.

SUMMARY

A method, an apparatus and a system for neighbor discovery are provided by embodiments of the disclosure to solve the problems of producing numerous invalid detections, increased apparatus load and large CPU resource consumption when performing neighbor detection by traversing the public network VLAN and private network VLAN in prior arts.

To solve the above technical problems, an embodiment of the disclosure provides a neighbor discovery method, comprising:

transmitting a neighbor detection message according to a neighbor virtual local area network VLAN information table, where the neighbor VLAN information table comprises neighbor VLAN information;

receiving a neighbor response message with which a terminal responds; and acquiring a MAC address of the terminal according to the neighbor response message.

Another embodiment of the disclosure provides a neighbor discovery apparatus comprising:

a transmitter configured to transmit a neighbor detection message according to a neighbor VLAN information table, where the neighbor VLAN information comprises neighbor VLAN information;

a receiver configured to receive a neighbor response message with which a terminal responds; and an acquisition module configured to acquire a MAC address of the terminal according to the neighbor response message.

An embodiment of the disclosure provides a neighbor discovery system comprising a terminal and a network apparatus;

where the network apparatus is configured to transmit a neighbor detection message according to a neighbor VLAN information table, where the neighbor information table comprises neighbor VLAN information; receive a neighbor response message with which the terminal responds; and acquire a MAC address of the terminal according to the neighbor response message.

With the technical solutions provided by the embodiments of the disclosure, by storing the detected neighbor VLAN information, and preferential detecting of stored neighbor VLAN information when customers mostly gather in a certain or some certain VLANs, invalid neighbor detection messages and replicating of neighbor detection multicast messages can be decreased, an apparatus load can be alleviated, and neighbor discovery can be expedited.

BRIEF DESCRIPTION OF THE DRAWINGS

In order to clearly recite the technical solutions of the embodiments of the present disclosure, drawings for illustrating the embodiments will be briefly described in the following. The drawings are only related to exemplary embodiments of the present disclosure; and those skilled in the art could derive other drawings from these drawings without departing from the principles of the described invention.

DETAILED DESCRIPTION

The technical solutions of the embodiments of the disclosure will be described in a clearly and fully understandable way in connection with the drawings related to the embodiments of the present disclosure. The described embodiments are merely exemplary. From the described embodiments herein, those skilled in the art can derive other embodiments without departing from the principles of the described invention.

Embodiments of the present disclosure provide a method, an apparatus and a system for neighbor discovery. The method comprises: transmitting a neighbor detection message according to a neighbor virtual local area network VLAN information table, where the neighbor VLAN information table comprises neighbor VLAN information; receiving a neighbor response message with which a terminal responds; and acquiring a MAC address of the terminal according to the neighbor response message. By using the technical solutions provided by the embodiments of the present disclosure, invalid neighbor detection and replicating of multicast message in neighbor detection can be decreased, an apparatus load can be alleviated, and the procedure of neighbor discovery can be expedited, thereby solving the problems of numerous invalid detections, heavy apparatus load and large CPU resource consumption caused by traversing the public network VLAN and private network VLAN to conduct neighbor detection.

To make the above objects, features and advantages of the present disclosure more obvious and understandable, embodiments of the present disclosure will be described in detail in the following with reference to the drawings.

Embodiment 1

Figure 1:
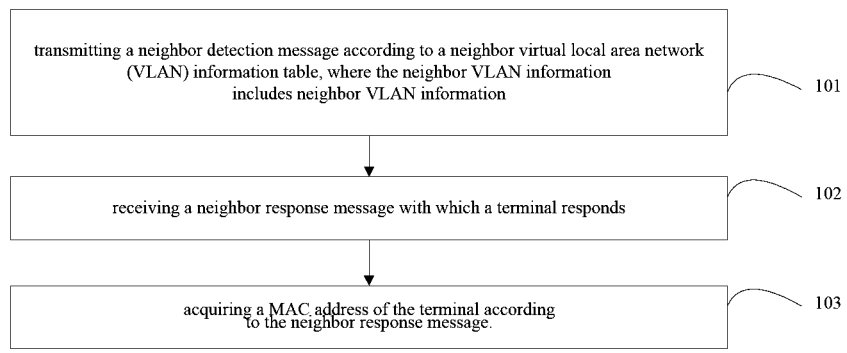
FIG. 1 is a flow chart of a neighbor discovery method in accordance with an embodiment of the present disclosure.

FIG. 1 shows a flow chart of a neighbor discovery method in accordance with an embodiment of the present disclosure. The method comprises:

101: transmitting a neighbor detection message according to a neighbor VLAN information table, where the neighbor VLAN information table includes neighbor VLAN information.

A network apparatus transmits the neighbor detection message according to the neighbor VLAN information table, where the neighbor VLAN information table includes the neighbor VLAN information. The neighbor VLAN information may include a public network VLAN tag and a private network VLAN tag.

Before transmitting the neighbor detection message according to the neighbor VLAN information table, the network apparatus may receive a neighbor detection message from a first terminal, where a source IP address of the neighbor detection message is an IP address of the first terminal, a source MAC address is a MAC address of the first terminal, a destination IP address is an IP address of a terminal to be detected, and a destination MAC address is a multicast address. The neighbor detection message may include VLAN information of the first terminal, such as public network VLAN tag and private VLAN tag.

Optionally, the network apparatus constructs the neighbor VLAN information table according to the neighbor detection message from the first terminal.

The neighbor VLAN information table may further include the number of neighbors. Accordingly, the neighbor VLAN information in the neighbor VLAN information table corresponds to the number of neighbors.

The neighbor VLAN information table may be arranged in a descending order from more neighbors to less neighbors, or in an ascending order from less neighbors to more neighbors.

The transmitting neighbor detection message according to the neighbor VLAN information table to perform neighbor detection by the network apparatus, may comprise:

transmitting the neighbor detection message in turn according to neighbor VLAN information in the neighbor VLAN information table. As an example, the neighbor detection message is first transmitted according to first neighbor VLAN information in the neighbor VLAN information table. When a neighbor response message is not received, then the neighbor detection message is transmitted according to second neighbor VLAN information in the neighbor VLAN information table, and the rest may be deduced by analogy.

Alternatively, it may comprise:

transmitting the neighbor detection message according to the neighbor VLAN information in the neighbor VLAN information table, based on the number of neighbors. As an example, the neighbor detection message is first transmitted according to the neighbor VLAN information relating to VLAN having the most number of neighbors. When a neighbor response message is not received, then the neighbor detection message is transmitted according to the neighbor VLAN information relating to VLAN having the second-most number of neighbors, and the rest may be deduced by analogy.

Alternatively, it may comprise:

transmitting the neighbor detection message according to the neighbor VLAN information relating to VLAN having the number of neighbors more than a predetermined threshold. As an example, if the threshold is set to 5, then the neighbor detection message is transmitted according to neighbor VLAN information relating to VLAN having more than 5 neighbors which is recorded in the neighbor VLAN information table.

102: receiving a neighbor response message with which a terminal responds.

Optionally, the terminal receives the neighbor detection message transmitted in 101, and responds with a neighbor response message in response to the neighbor detection message, the neighbor response message carries a MAC address of the terminal.

Optionally, in IPv4, the neighbor detection message includes an address resolution protocol (ARP) request message, and the neighbor response message includes an ARP response message. In IPv6, the neighbor detection message includes a neighbor solicitation (NS) message, and the neighbor response message includes a neighbor advertisement (NA) message.

103: acquiring a MAC address of the terminal according to the neighbor response message.

Optionally, the neighbor response message includes VLAN information about the terminal, such as a public network VLAN tag and a private network VLAN tag of the terminal.

Furthermore, after acquiring the MAC address of the terminal, the method provided by an embodiment of the present disclosure may optionally includes:

104: updating the neighbor VLAN information table according to the neighbor response message.

When the VLAN information about the terminal is different from any one of an existing neighbor VLAN information in the neighbor VLAN information table, the VLAN information about the terminal may be added to the neighbor VLAN information table. Optionally, the number of neighbors is correspondingly set to 1.

When the VLAN information about the terminal is same as one of the existing neighbor VLAN information in the neighbor VLAN information table, the number of neighbors corresponding to the one of the existing neighbor VLAN information may be increased by 1.

With the technical solution provided by the embodiment of the present disclosure, when customers mostly gather in a certain or some certain VLANs, by preferential detecting of stored neighbor VLAN information, invalid neighbor detection messages can be decreased, an apparatus load can be alleviated, and the procedure of neighbor discovery can be expedited, thereby solving the problems of numerous invalid detections, heavy apparatus load and large CPU resource consumption caused by traversing the public network VLAN and private network VLAN to conduct neighbor detection.

Embodiment 2

Figure 2:
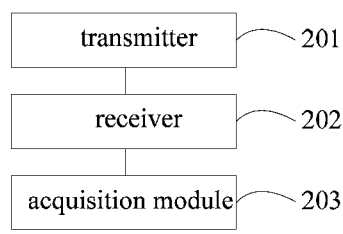
FIG. 2 is a block diagram of a neighbor discovery apparatus in accordance with an embodiment of the present disclosure.

FIG. 2 shows a block diagram of a neighbor discovery apparatus provided by an embodiment of the present disclosure. The apparatus comprises a transmitter 201, a receiver 202 and an acquisition module 203. Where:

the transmitter 201, configured to transmit a neighbor detection message according to a neighbor VLAN information table, where the neighbor VLAN information table comprises neighbor VLAN information;

the receiver 202, configured to receive a neighbor response message with which a terminal responds;

optionally, the neighbor detection message is received by the terminal, the terminal will respond with a neighbor response message in response to the neighbor detection message; the neighbor response message carries a MAC address of the terminal, and the acquisition module 203, configured to acquire a MAC address of the terminal according to the neighbor response message.

The neighbor VLAN information includes a public network VLAN tag and a private network VLAN tag.

The neighbor VLAN information table may further include the number of neighbors. Accordingly, the neighbor VLAN information in the neighbor VLAN information table corresponds to the number of neighbors.

The neighbor VLAN information table may be arranged in a descending order from more neighbors to less neighbors, or in an ascending order from less neighbors to more neighbors.

The transmitter 201 may be further configured to transmit the neighbor detection message in turn, according to neighbor VLAN information in the neighbor VLAN information table. As an example, it first transmits the neighbor detection message according to first neighbor VLAN information in the neighbor VLAN information table. If no neighbor response message is received, it transmits the neighbor detection message according to second neighbor VLAN information in the neighbor VLAN information table, and the rest may be deduced by analogy.

The transmitter 201 may be further configured to transmit the neighbor detection message according to the neighbor VLAN information in the neighbor VLAN information table, based on the number of neighbors. As an example, the neighbor detection message is first transmitted according to the neighbor VLAN information relating to VLAN having the most number of neighbors. When no neighbor response message is received, a neighbor detection message is transmitted according to the neighbor VLAN information relating to VLAN having the second-most number of neighbors, and the rest may be deduced by analogy.

The transmitter 201 may be further configured to transmit the neighbor detection message according to neighbor VLAN information relating to VLAN having the number of neighbors more than a predetermined threshold. As an example, if the threshold is set to 5, then the neighbor detection message is transmitted according to neighbor VLAN information relating to VLAN having more than 5 neighbors which is recorded in the neighbor VLAN information table.

Figure 3:
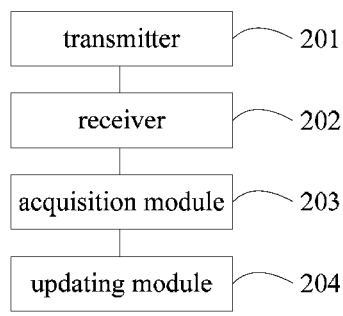
FIG. 3 is a block diagram of another neighbor discovery apparatus in accordance with an embodiment of the present disclosure.

As showed in FIG. 3, the apparatus may further comprises:

an updating module 204 configured to update the neighbor VLAN information table according to the neighbor response message.

Optionally, the neighbor response message includes VLAN information about the terminal, such as a public network VLAN tag and a private network VLAN tag.

When the VLAN information about the terminal is different from any one of an existing neighbor VLAN information in the neighbor VLAN information table, the VLAN information about the terminal may be added to the neighbor VLAN information table. Optionally, the number of neighbors is correspondingly set to 1.

When the VLAN information about the terminal is same as one of the existing neighbor VLAN information in the neighbor VLAN information table, the number of neighbors corresponding to the existing neighbor VLAN information may be increased by 1.

Figure 4:
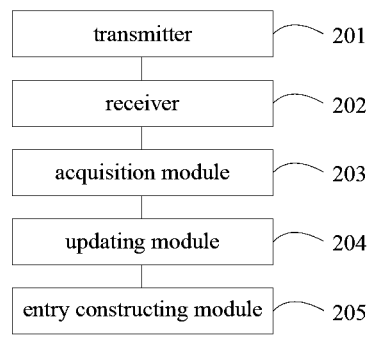
FIG. 4 is a block diagram of another neighbor discovery apparatus in accordance with an embodiment of the present disclosure.

Optionally, as showed in FIG. 4, the apparatus may further comprises:

an entry constructing module 205 configured to construct the neighbor VLAN information table according to a neighbor detection message from a first terminal, where the neighbor detection message from the first terminal includes VLAN information about the first terminal, such as a public network VLAN tag and a private network VLAN tag.

Optionally, in IPv4, the neighbor detection message includes an address resolution protocol (ARP) request message, and the neighbor response message includes an ARP response message. In IPv6, the neighbor detection message includes a neighbor solicitation (NS) message, and the neighbor response message includes a neighbor advertisement (NA) message.

Embodiment 3

Figure 5:
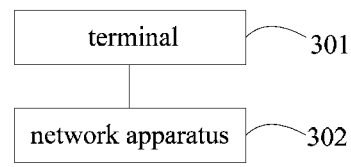
FIG. 5 is a block diagram of a neighbor discovery system in accordance with an embodiment of the present disclosure.

FIG. 5 shows a block diagram of a neighbor discovery system provided by an embodiment of the present disclosure. The system comprises a terminal 301 and a network apparatus 302, where:

the network apparatus 302, is configured to transmit a neighbor detection message according to a neighbor VLAN information table, where the neighbor VLAN information table includes neighbor VLAN information; receive a neighbor response message with which the terminal 301 responds; and acquire a MAC address of the terminal 301 according to the neighbor response message.

The neighbor VLAN information may include a public network VLAN tag and a private network VLAN tag.

Before transmitting the neighbor detection message according to the neighbor VLAN information table, the network apparatus 302 may receive a neighbor detection message from a first terminal, the neighbor detection message may include VLAN information about the first terminal, such as a public network VLAN tag and a private VLAN tag.

Optionally, the network apparatus constructs the neighbor VLAN information table according to the neighbor detection message from the first terminal.

The neighbor VLAN information table may further include the number of neighbors. Accordingly, the neighbor VLAN information in the neighbor VLAN information table corresponds to the number of neighbors.

The network apparatus 302 may transmit the neighbor detection message in turn, according to neighbor VLAN information in the neighbor VLAN information table, and perform neighbor detection.

The network apparatus 302 may also transmit the neighbor detection message according to the neighbor VLAN information in the neighbor VLAN information table, based on the number of neighbors, and perform neighbor detection.

The network apparatus 302 may further transmit the neighbor detection message according to the neighbor VLAN information relating to VLAN having the number of neighbors more than a predetermined threshold, and perform neighbor detection.

Optionally, the neighbor detection message transmitted by the network apparatus 302 is received by the terminal 301, which will respond with a neighbor response message carrying the MAC address of the terminal 301, in response to the neighbor detection message.

Optionally, the neighbor response message includes VLAN information about the terminal 301, such as a public network VLAN tag and a private network VLAN tag of the terminal 301, and the network apparatus 302 updates the neighbor VLAN information table according to the VLAN information about the terminal 301.

Optionally, in IPv4, the neighbor detection message includes an address resolution protocol (ARP) request message, and the neighbor response message includes an ARP response message. In IPv6, the neighbor detection message includes a neighbor solicitation (NS) message, and the neighbor response message includes a neighbor advertisement (NA) message.

With the technical solution provided by the embodiment of the present disclosure, when customers mostly gather in a certain or some VLANs, by preferential detection of stored neighbor VLAN information, invalid neighbor detection can be decreased, a load of apparatus can be alleviated, a neighbor discovery can be expedited, thereby solving the problems of numerous invalid detections, heavy apparatus load and large CPU resource consumption caused by traversing the public network VLAN and the private network VLAN to conduct neighbor detection.

It can be understood by those skill in the art that a part or all of the flow in the above method embodiments may be realized by a program giving instructions to related hardware, and the program may be stored on a computer readable storage medium, the storage medium may be a magnetic disk, an optical disk, a ROM or a RAM, and the like.

What are described above is merely specific embodiments of the present disclosure and not limitative to the protection scope of the present disclosure. Those skilled in the art can conceive various modifications and equivalents according to the teachings of the disclosure which is within the protection scope of the present disclosure.

What is claimed is:

1. A neighbor discovery method, comprising:
    transmitting a neighbor detection message according to a neighbor virtual local area network (VLAN) information table, wherein the neighbor VLAN information table comprises one or more entries of neighbor VLAN information and further comprises a number of neighbors corresponding to each entry of neighbor VLAN information;
    receiving a neighbor response message, in response to the transmitted neighbor detection message, from a terminal;
    acquiring a media access control (MAC) address of the terminal according to the neighbor response message; and
    updating the neighbor VLAN information table according to the neighbor response message, where the updating comprises:
        when neighbor VLAN information included in the neighbor response message is different from all existing entries of neighbor VLAN information in the neighbor VLAN information table, adding the neighbor VLAN information included in the neighbor response message to the neighbor VLAN information table, and setting the number of neighbors corresponding to the added neighbor VLAN information to 1;
        when the neighbor VLAN information included in the neighbor response message is the same as an existing entry of neighbor VLAN information in the neighbor VLAN information table, increasing the number of neighbors corresponding to the existing entry of neighbor VLAN information by 1.

2. The method of claim 1, wherein before transmitting the neighbor detection message according to the neighbor VLAN information table, the method further comprises:
    receiving a neighbor detection message from a first terminal; and
    constructing the neighbor VLAN information table according to the neighbor detection message from the first terminal.

3. A neighbor discovery apparatus, comprising:
    a transmitter configured to transmit a neighbor detection message according to a neighbor VLAN information table, where the neighbor VLAN information table comprises one or more entries of neighbor VLAN information and further comprises a number of neighbors corresponding to each entry of neighbor VLAN information;
    a receiver configured to receive a neighbor response message, in response to the transmitted neighbor detection message, from a terminal;
    an acquisition module configured to acquire a media access control (MAC) address of the terminal according to the neighbor response message; and
    an updating module configured to update the neighbor VLAN information table according to the neighbor response message;
    wherein the updating module is further configured to, when neighbor VLAN information included in the neighbor response message is different from all existing entries of neighbor VLAN information in the neighbor VLAN information table, add the neighbor VLAN information included in the neighbor response message to the neighbor VLAN information table, and to set the number of neighbors corresponding to the added neighbor VLAN information to 1;
    where the updating module is further configured to, when the neighbor VLAN information included in the neighbor response message is the same as an existing entry of neighbor VLAN information in the neighbor VLAN information table, increase the number of neighbors corresponding to the existing entry of neighbor VLAN information by 1.

4. The apparatus of claim 3, further comprising:
    an entry constructing module configured to construct the neighbor VLAN information table according to a neighbor detection message from a first terminal.

5. A neighbor discovery system, comprising:
a terminal; and
a network apparatus;
wherein the network apparatus is configured to:
- transmit a neighbor detection message according to a neighbor VLAN information table, wherein the neighbor VLAN information table comprises one or more entries of neighbor VLAN information and further comprises a number of neighbors corresponding to each entry of neighbor VLAN information;
- receive a neighbor response message, in response to the transmitted neighbor detection message, from the terminal;
- acquire a media access control (MAC) address of the terminal according to the neighbor response message; and
- update the neighbor VLAN information table according to the neighbor response message;
- wherein, when neighbor VLAN information included in the neighbor response message is different from all existing entries of neighbor VLAN information in the neighbor VLAN information table, the neighbor VLAN information included in the neighbor response message is added to the neighbor VLAN information table, and the number of neighbors corresponding to the added neighbor VLAN information is set to 1; and
- wherein, when the neighbor VLAN information included in the neighbor response message is the same as an existing entry of neighbor VLAN information in the neighbor VLAN information table, the number of neighbors corresponding to the existing entry of neighbor VLAN information is increased by 1.

6. The neighbor discovery system of claim 5, wherein the network apparatus is further configured to construct the neighbor VLAN information table according to a neighbor detection message from a first terminal.

* * * * *